(12) United States Patent
Chen (10) Patent No.: US 9,981,678 B1
(45) Date of Patent: May 29, 2018

(54) FOLDABLE STROLLER (71) Applicant: Way-Hong Chen, Taipei (TW)

(72) Inventor: Way-Hong Chen, Taipei (TW)

(*) Notice: Subject to any disclaimer, the term of this patent is extended or adjusted under 35 U.S.C. 154(b) by 0 days. days.

(21) Appl. No.: 15/708,190

(22) Filed: Sep. 19, 2017

(51) Int. Cl.
B62B 7/06 (2006.01)

(52) U.S. Cl.
CPC .............. *B62B 7/068* (2013.01); *B62B 7/062* (2013.01); *B62B 2205/20* (2013.01)

(58) Field of Classification Search
CPC ........... B62B 7/06; B62B 7/062; B62B 7/064; B62B 7/068
See application file for complete search history.

(56) References Cited

U.S. PATENT DOCUMENTS

| | | | |
|---|---|---|---|
| D715,701 S * | 10/2014 | Chen | D12/129 |
| 8,894,090 B1 * | 11/2014 | Chen | B62B 7/086 280/47.38 |
| 9,090,277 B1 * | 7/2015 | Chen | B62B 7/086 |
| 2006/0214395 A1 * | 9/2006 | Ageneau | B62B 7/06 280/642 |
| 2012/0187660 A1 * | 7/2012 | Liao | B62B 7/086 280/642 |
| 2013/0257019 A1 * | 10/2013 | Eisinger | B62B 7/06 280/650 |
| 2014/0008895 A1 * | 1/2014 | Lee | B62B 7/062 280/647 |
| 2015/0076777 A1 * | 3/2015 | Cheng | B62B 7/068 280/42 |
| 2016/0167690 A1 * | 6/2016 | Lin | B62B 7/062 280/642 |
| 2017/0066465 A1 * | 3/2017 | Hanson | B62B 7/06 |
| 2017/0096158 A1 * | 4/2017 | Hanson | B60B 33/026 |

* cited by examiner

*Primary Examiner* — Katy M Ebner
(74) *Attorney, Agent, or Firm* — Alan D. Kamrath; Kamrath IP Lawfirm, P.A.

(57) ABSTRACT

A foldable stroller includes a main frame, a support unit, two fixed side units, two movable side units, and a guardrail. The main frame includes two joints, two upper connectors, a handlebar, two lower connectors, a lower bar and two front wheels. Each of the two fixed side units includes a leg, a first locking member, a first spring, a fixed block, a release member, a ramp, a pull handle, a second spring, a wheel support and a rear wheel. Each of the two movable side units includes a movable block, a press knob, an extension, a second locking member, a third spring and two braces. Thus, the first locking member and the second locking member construct a two-stage locking mechanism, to lock the stroller steadily, thereby preventing the stroller from being folded accidentally.

5 Claims, 8 Drawing Sheets

FOLDABLE STROLLER

BACKGROUND OF THE INVENTION

1. Field of the Invention

The present invention relates to a stroller and, more particularly, to a foldable stroller for a baby or child.

2. Description of the Related Art

A conventional stroller comprises a main frame that is folded when not in use so as to reduce the whole volume of the stroller. However, the folded stroller still has a determined volume and occupies a larger space, thereby easily causing inconvenience in storage and carrying of the stroller. In addition, the conventional stroller only has a single locking mechanism that is controlled by a push button to lock the main frame when the stroller is expanded, so that when the push button is pressed inadvertently, the locking mechanism is unlocked, and the stroller is folded accidentally, thereby causing danger to the baby placed in the stroller.

BRIEF SUMMARY OF THE INVENTION

The primary objective of the present invention is to provide a foldable stroller whose whole volume is reduced largely after being folded.

In accordance with the present invention, there is provided a foldable stroller comprising a main frame, a support unit, two fixed side units, two movable side units, and a guardrail. The main frame includes two joints, two upper connectors pivotally connected with the two joints respectively, a handlebar having two ends secured on the two upper connectors respectively, two lower connectors pivotally connected with the two joints respectively, a lower bar having two ends secured on the two lower connectors, and two front wheels mounted on a lower portion of the lower bar. The support unit includes two connecting members pivotally connected with the two lower connectors respectively, a movable support bar having two ends secured on the two connecting members respectively, and a fixed support rod having two ends mounted on the two connecting members respectively. Each of the two fixed side units includes a leg having an upper end secured to one of the two joints and having a side provided with an opening, a first locking member movably mounted in the leg, a first spring biased between the first locking member and the leg to push the first locking member to protrude from the opening of the leg, a fixed block secured on the leg and having an interior provided with a receiving chamber and a face provided with a first locking hole connected to the receiving chamber, a release member movably mounted in the receiving chamber of the fixed block and provided with a cavity aligning with the first locking hole of the fixed block, a ramp formed on a bottom of the cavity of the release member, a pull handle secured on the release member and protruding from the fixed block, a second spring biased between the release member and the fixed block to push the release member and to align the cavity of the release member with the first locking hole of the fixed block, a wheel support mounted on a lower end of the leg, and a rear wheel pivotally mounted on the wheel support. Each of the two movable side units includes a movable block slidably mounted on the leg and having a side provided with a second locking hole aligning with the opening of the leg and allowing insertion of the first locking member, a press knob mounted on the movable block and having a side provided with a projection aligning with the second locking hole of the movable block and resting on the first locking member, an extension extending upward from the movable block and having a side provided with a receiving recess aligning with the first locking hole of the fixed block, a second locking member movably mounted in the receiving recess of the extension, a third spring biased between the second locking member and the movable block to push the second locking member through the receiving recess of the extension into the first locking hole of the fixed block, and two braces each having a lower end pivotally connected with the movable block. One of the two braces of each of the two movable side units has an upper end pivotally connected with one of the two upper connectors of the main frame, and the other one of the two braces of each of the two movable side units has an upper end pivotally connected with one of the two lower connectors of the main frame. The guardrail has two opposite ends removably mounted on the two joints of the main frame respectively.

According to the primary advantage of the present invention, the handlebar and the lower bar are closer to the leg after the stroller is folded, thereby greatly reducing the whole volume and space of storage of the folded stroller, thereby facilitating storage, carrying and transportation of the stroller.

According to another advantage of the present invention, the first locking member and the second locking member construct a two-stage locking mechanism, to lock the stroller steadily, thereby preventing the stroller from being folded accidentally, and thereby protecting the baby's safety.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a foldable stroller in accordance with the preferred embodiment of the present invention comprises a main frame 1, a support unit 2, two fixed side units 3, two movable side units 4, and a guardrail 5.

The main frame 1 includes two joints 12, two upper connectors 111 pivotally connected with the two joints 12 respectively, a handlebar 11 having two ends secured on the two upper connectors 111 respectively, two lower connectors 131 pivotally connected with the two joints 12 respectively, a lower bar 13 having two ends secured on the two lower connectors 131, and two front wheels 14 mounted on a lower portion of the lower bar 13. The handlebar 11 is substantially U-shaped. The lower bar 13 is substantially U-shaped.

The support unit 2 includes two connecting members 211 pivotally connected with the two lower connectors 131 respectively, a movable support bar 21 having two ends secured on the two connecting members 211 respectively, and a fixed support rod 22 having two ends mounted on the two connecting members 211 respectively.

The two fixed side units 3 are arranged at two sides of the main frame 1 symmetrically. Each of the two fixed side units 3 includes a leg 31 having an upper end secured to one of the two joints 12 and having a side provided with an opening 311, a first locking member 33 movably mounted in the leg 31, a first spring 331 biased between the first locking member 33 and the leg 31 to push the first locking member 33 to protrude from the opening 311 of the leg 31, a fixed block 34 secured on the leg 31 and having an interior provided with a receiving chamber 341 and a face provided with a first locking hole 343 connected to the receiving chamber 341, a release member 35 movably mounted in the receiving chamber 341 of the fixed block 34 and provided with a cavity 351 aligning with the first locking hole 343 of the fixed block 34, a ramp 352 formed on a bottom of the cavity 351 of the release member 35, a pull handle 355 secured on the release member 35 and protruding from the fixed block 34, a second spring 356 biased between the release member 35 and the fixed block 34 to push the release member 35 and to align the cavity 351 of the release member 35 with the first locking hole 343 of the fixed block 34, a wheel support 36 mounted on a lower end of the leg 31, and a rear wheel 37 pivotally mounted on the wheel support 36. The fixed block 34 is located above the opening 311 of the leg 31 and has a side provided with an elongate slot 344 connected to the receiving chamber 341. The pull handle 355 is disposed in and protrudes from the elongate slot 344 of the fixed block 34.

The two movable side units 4 are mounted on the two fixed side units 3 respectively. Each of the two movable side units 4 includes a movable block 41 slidably mounted on the leg 31 and having a side provided with a second locking hole 411 aligning with the opening 311 of the leg 31 and allowing insertion of the first locking member 33, a press knob 42 mounted on the movable block 41 and having a side provided with a projection 421 aligning with the second locking hole 411 of the movable block 41 and resting on the first locking member 33, an extension 412 extending upward from the movable block 41 and having a side provided with a receiving recess 413 aligning with the first locking hole 343 of the fixed block 34, a second locking member 43 movably mounted in the receiving recess 413 of the extension 412, a third spring 431 biased between the second locking member 43 and the movable block 41 to push the second locking member 43 through the receiving recess 413 of the extension 412 into the first locking hole 343 of the fixed block 34, and two braces 44 each having a lower end pivotally connected with the movable block 41. One of the two braces 44 of each of the two movable side units 4 has an upper end pivotally connected with one of the two upper connectors 111 of the main frame 1, and the other one of the two braces 44 of each of the two movable side units 4 has an upper end pivotally connected with one of the two lower connectors 131 of the main frame 1. When the movable block 41 slides on the leg 31 to align the second locking hole 411 with the opening 311 of the leg 31, the first locking member 33 is pushed by the first spring 331 and is locked into the second locking hole 411 and presses the projection 421 of the press knob 42. When the movable block 41 slides on the leg 31 to align the second locking hole 411 with the opening 311 of the leg 31, the receiving recess 413 of the extension 412 aligns with the first locking hole 343 of the fixed block 34, and the second locking member 43 is pushed by the third spring 431 and extends through the first locking hole 343 of the fixed block 34 into the cavity 351 of the release member 35. At this time, the second locking member 43 rests on the ramp 352 of the release member 35.

The guardrail 5 has two opposite ends removably mounted on the two joints 12 of the main frame 1 respectively.

In the preferred embodiment of the present invention, the first spring 331 is a compression spring, the second spring 356 is a compression spring, and the third spring 431 is a compression spring.

In the preferred embodiment of the present invention, each of the two fixed side units 3 further includes an inner piece 32 secured in the leg 31 and provided with a receiving space 321 aligning with the opening 311 of the leg 31, and the first locking member 33 is mounted in the receiving space 321 of the inner piece 32. The first spring 331 is biased between the first locking member 33 and the inner piece 32.

In the preferred embodiment of the present invention, the receiving chamber 341 of the fixed block 34 of each of the two fixed side units 3 has a side provided with a slideway 342 connected to the first locking hole 343. The release member 35 is provided with a protrusion 353 movable in the slideway 342 of the fixed block 34. The protrusion 353 of the release member 35 is located under the cavity 351 and has a top provided with an oblique face 354 connected to the ramp 352 of the release member 35.

In the preferred embodiment of the present invention, the foldable stroller further comprises a connecting rod 6 mounted between the two fixed side units 3 and having two opposite ends each secured with the fixed block 34 of one of the two fixed side units 3.

In the preferred embodiment of the present invention, the foldable stroller further comprises a connecting pole 7 mounted between the two fixed side units 3 and having two opposite ends each secured with the wheel support 36 of one of the two fixed side units 3.

In expanding of the foldable stroller, again referring to FIGS. 1-5, the first locking member 33 is locked in the second locking hole 411 of the movable block 41, while the second locking member 43 is locked in the first locking hole 343 of the fixed block 34, so that the movable block 41 is located at a higher position, and the two braces 44 stretch the handlebar 11 and the lower bar 13 upward so as to expand the stroller. At this time, the movable support bar 21 is driven upward to adjust the rotation angle of the movable support bar 21. In such a manner, the handlebar 11, the lower bar 13, the movable support bar 21 and the fixed support rod 22 allow arrangement of a seat to placing the baby or child. At this time, the guardrail 5 is mounted on the two joints 12 to protect the baby or child.

Figure 1:
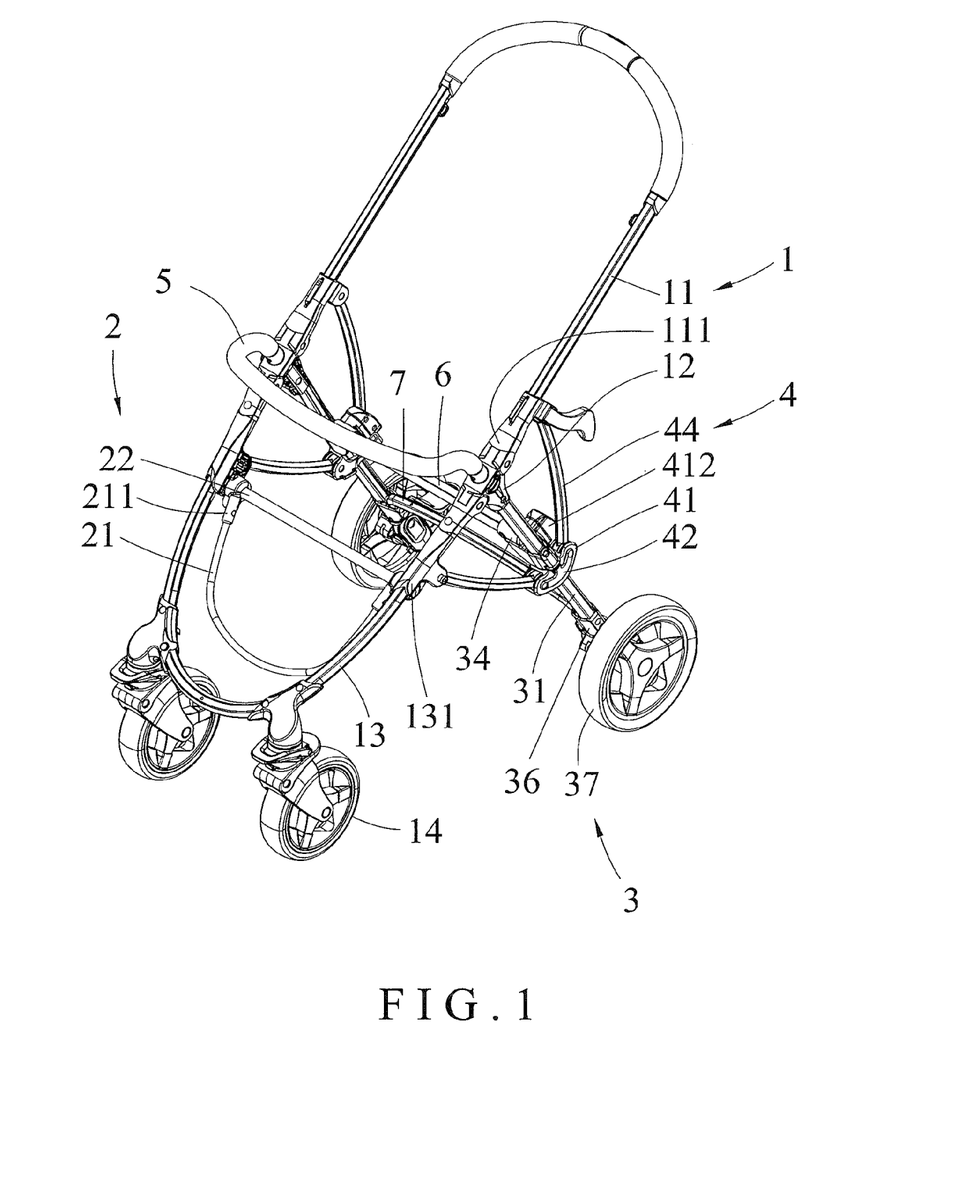
FIG. 1 is a perspective view of a foldable stroller in accordance with the preferred embodiment of the present invention.
Figure 2:
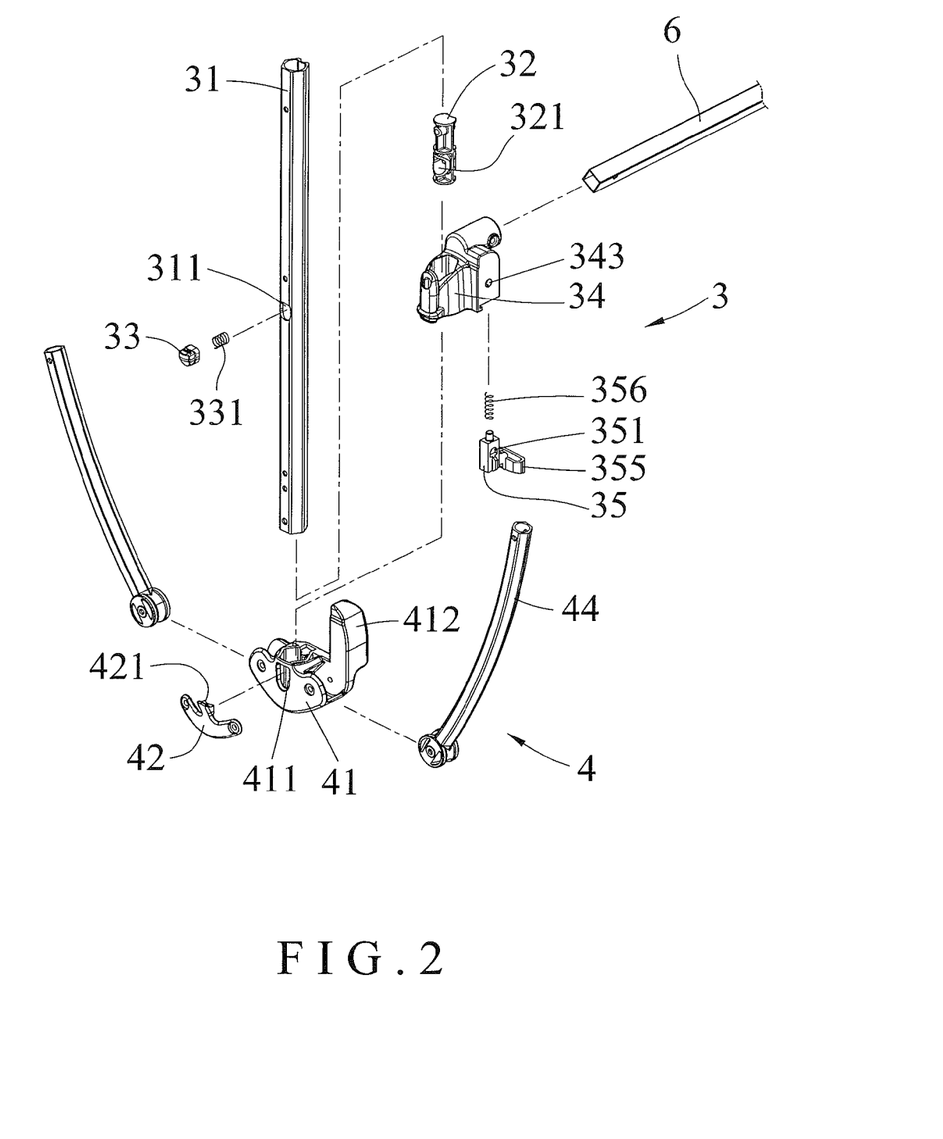
FIG. 2 is a partially exploded perspective view of the foldable stroller in accordance with the preferred embodiment of the present invention.
Figure 3:
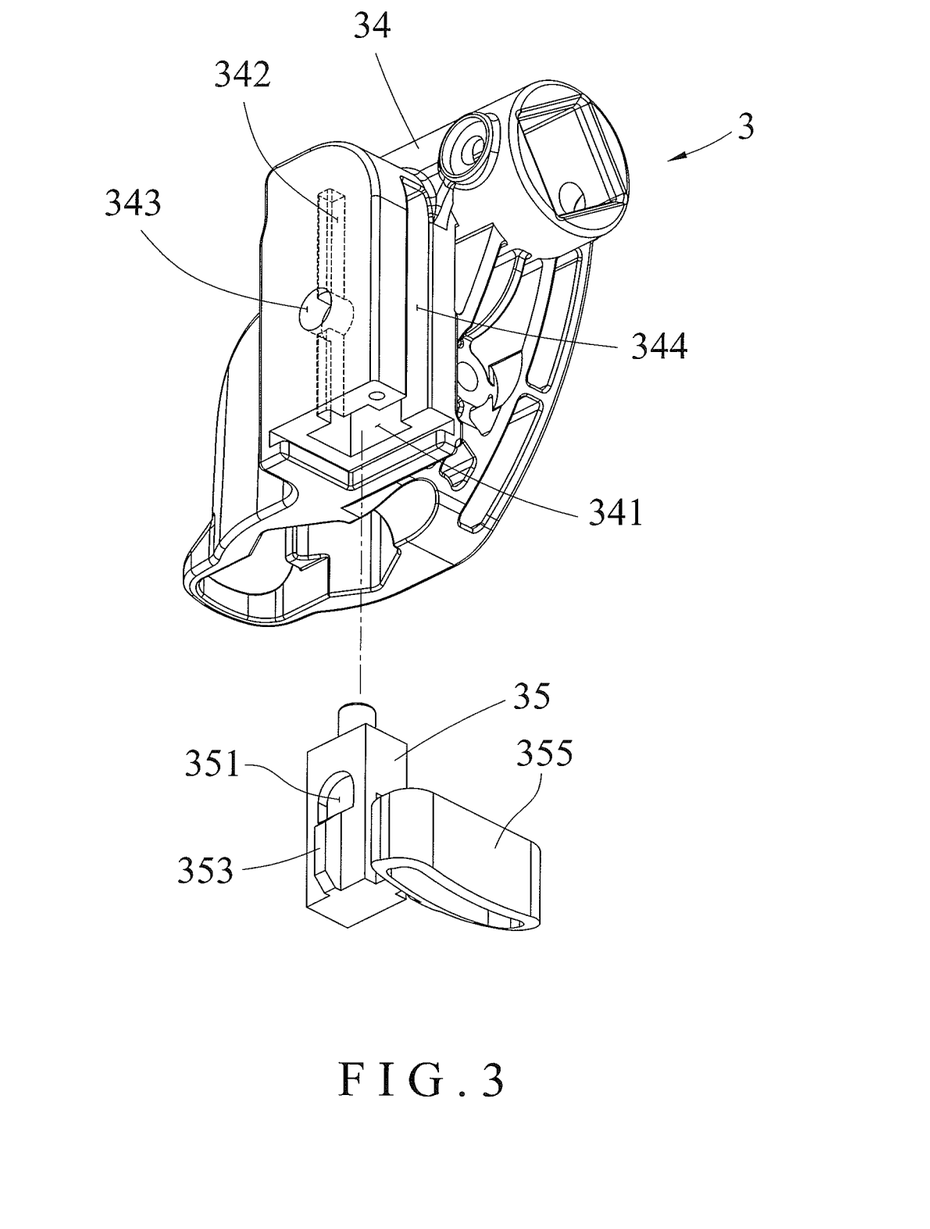
FIG. 3 is another partially exploded perspective view of the foldable stroller in accordance with the preferred embodiment of the present invention.
Figure 4:
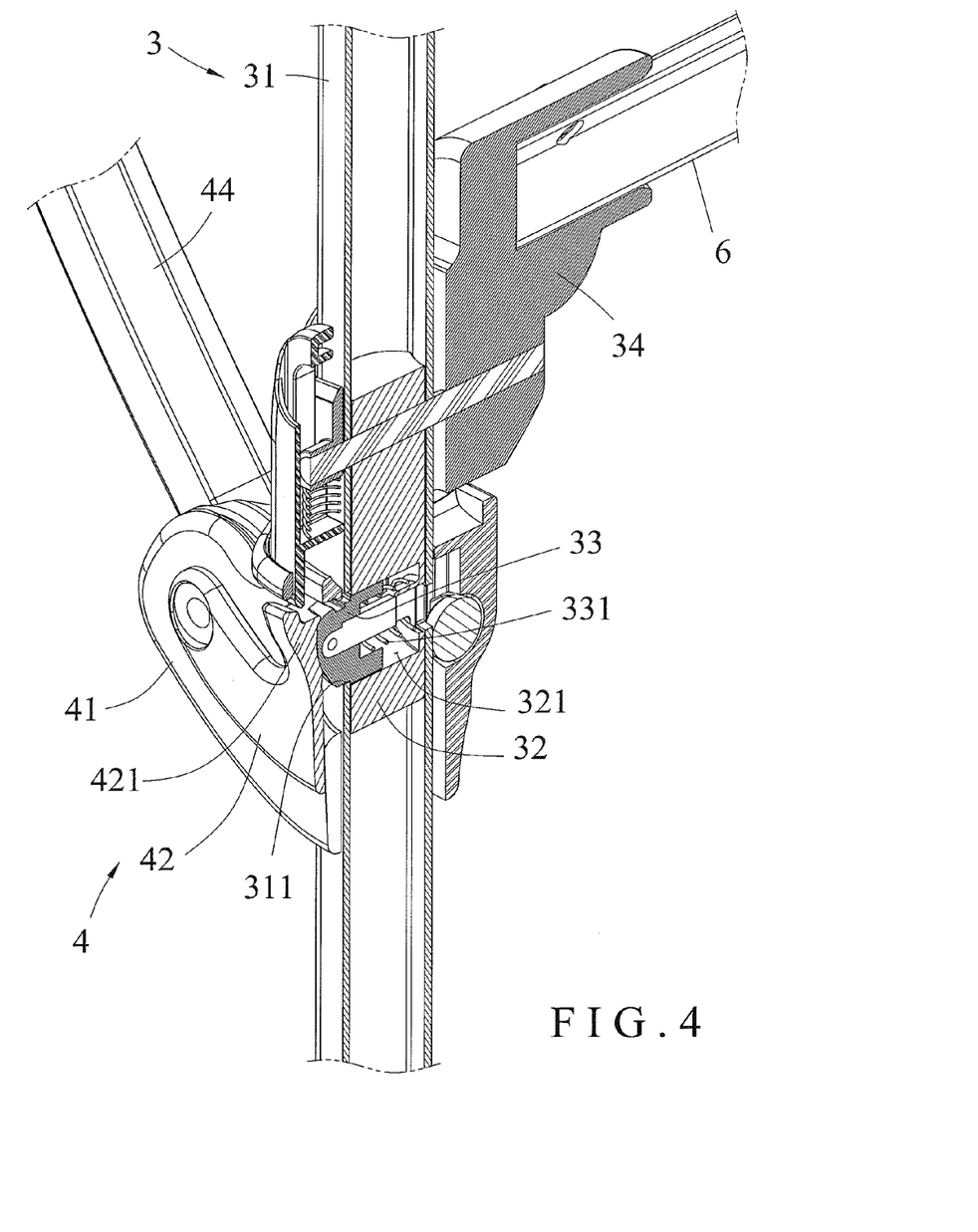
FIG. 4 is a partially perspective cross-sectional view of the foldable stroller in accordance with the preferred embodiment of the present invention.
Figure 5:
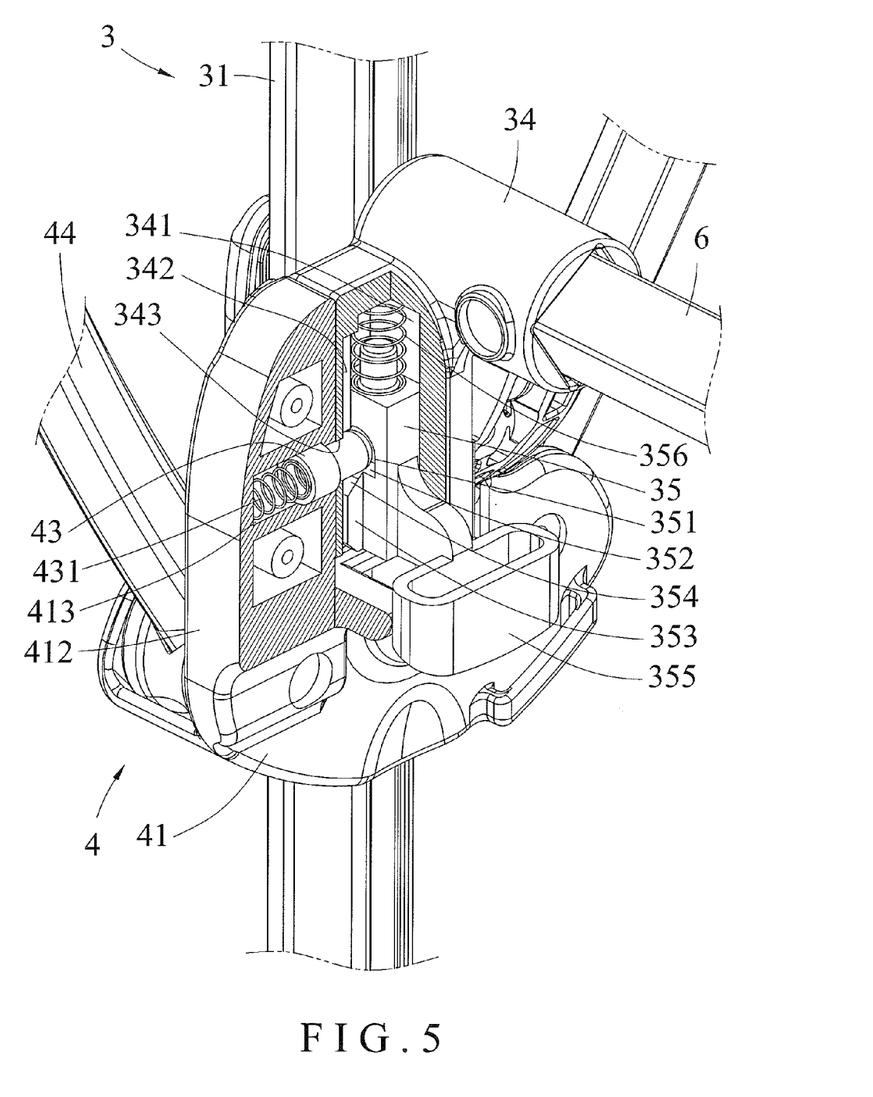
FIG. 5 is another partially perspective cross-sectional view of the foldable stroller in accordance with the preferred embodiment of the present invention.
Figure 6:
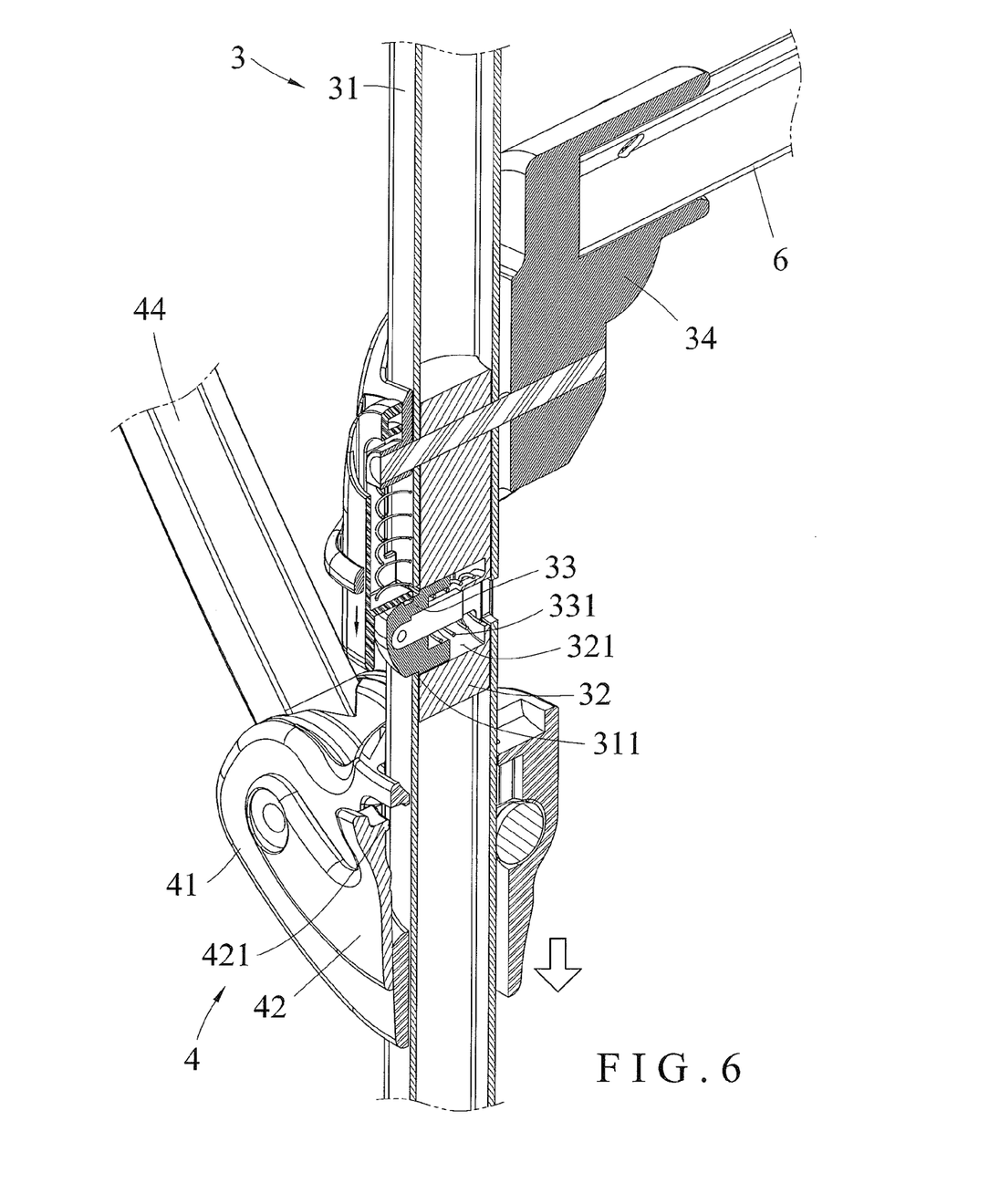
FIG. 6 is a schematic operational view of the foldable stroller as shown in FIG. 4.
Figure 7:
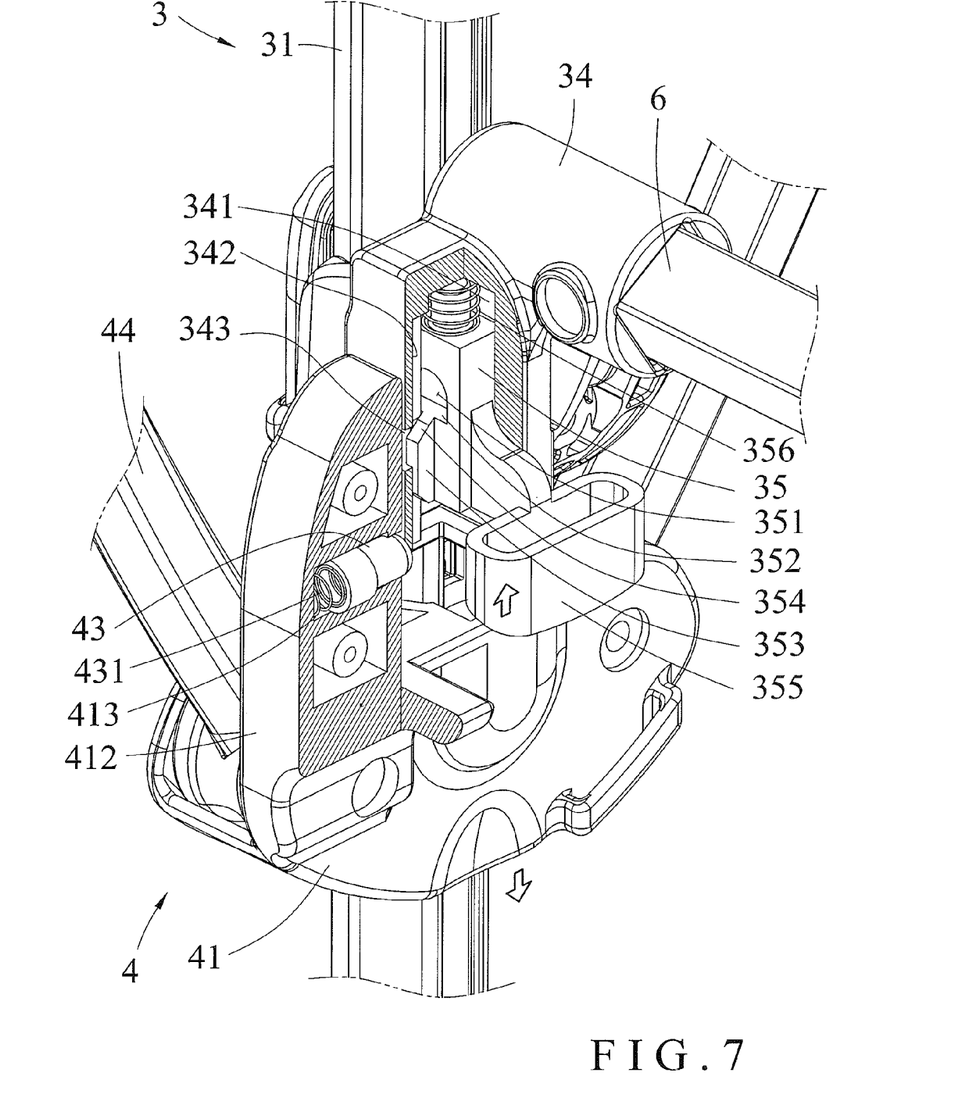
FIG. 7 is a schematic operational view of the foldable stroller as shown in FIG. 5.
Figure 8:
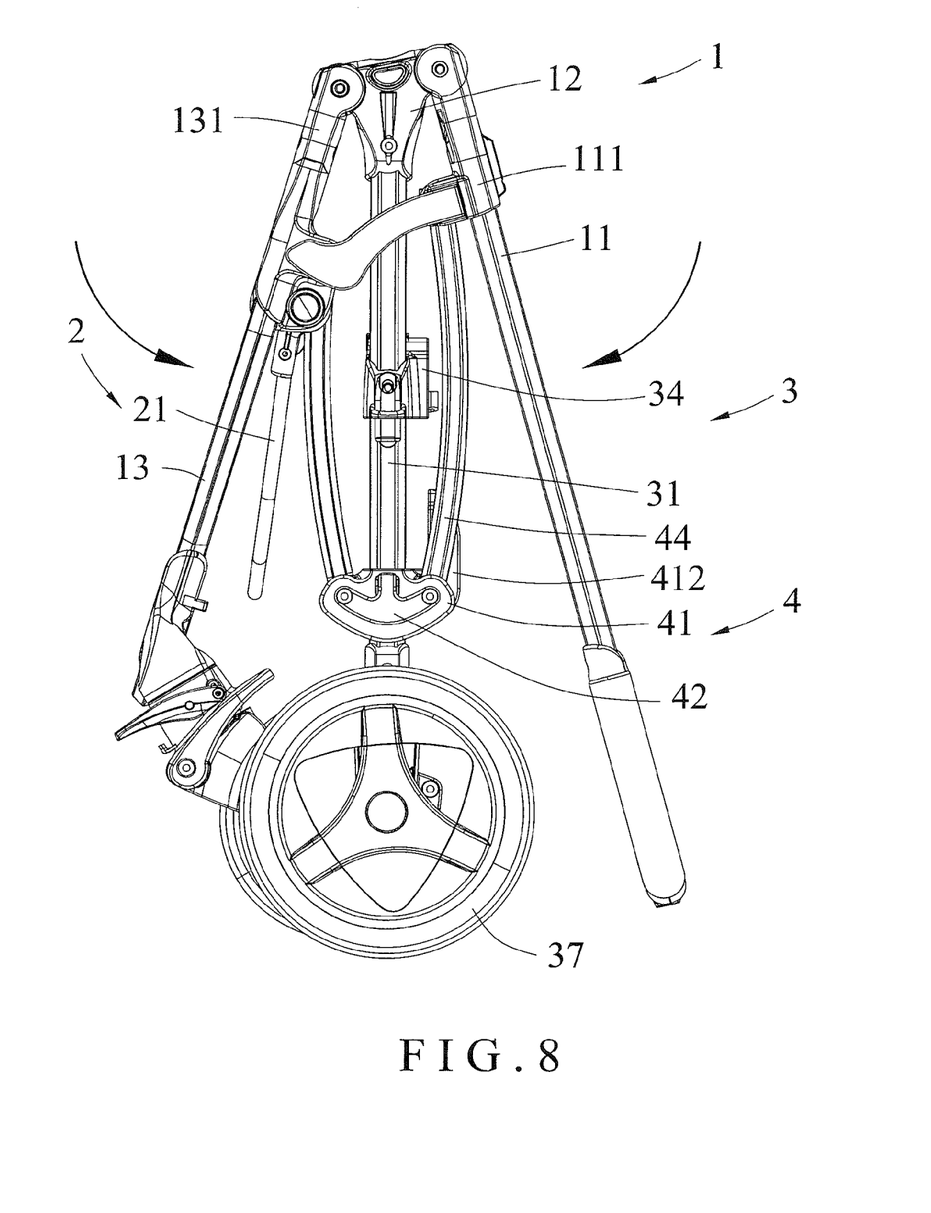
FIG. 8 is a planar folded view of the foldable stroller as shown in FIG. 1.

In folding of the foldable stroller, referring to FIGS. 6-8 with reference to FIGS. 1-5, the guardrail 5 is removed initially. Then, the press knob 42 is pressed, and the pull handle 355 is pulled upward simultaneously. When the press knob 42 is pressed, the projection 421 of the press knob 42 pushes the first locking member 33 toward the receiving space 321 of the inner piece 32, so that the first locking member 33 is detached from the second locking hole 411 of the movable block 41. When the pull handle 355 is pulled upward, the release member 35 slides upward, and the ramp 352 of the release member 35 and the oblique face 354 of the protrusion 353 are moved upward to push the second locking member 43, so that the second locking member 43 is pushed toward receiving recess 413 of the extension 412 and is detached from the first locking hole 343 of the fixed block 34. In such a manner, after the first locking member 33 is detached from the second locking hole 411 of the movable block 41, and after the second locking member 43 is detached from the first locking hole 343 of the fixed block 34, the movable block 41 is unlocked and is movable freely on the leg 31. Then, the movable block 41 of each of the two movable side units 4 is moved downward, to move the two braces 44 downward, and to move the handlebar 11 and the lower bar 13 downward toward the leg 31 so as to fold the stroller as shown in FIG. 8.

When the user wishes to expand the stroller again, the handlebar 11 and the lower bar 13 of each of the two movable side units 4 are pulled upward, to move the two braces 44 upward, and to move the movable block 41 upward. When the movable block 41 of each of the two movable side units 4 is moved to a position where the second locking hole 411 of the movable block 41 aligns with the first locking member 33, and the second locking member 43 aligns with the first locking hole 343 of the fixed block 34, the first locking member 33 is locked into the second locking hole 411 of the movable block 41 by the restoring force of the first spring 331, and the second locking member 43 is locked into the first locking hole 343 of the fixed block 34 by the restoring force of the third spring 431, so that the movable block 41 of each of the two movable side units 4 is locked onto the leg 31 of each of the two fixed side units 3, so as to expand the stroller.

Accordingly, the handlebar 11 and the lower bar 13 are closer to the leg 31 after the stroller is folded, thereby greatly reducing the whole volume and space of storage of the folded stroller, thereby facilitating storage, carrying and transportation of the stroller. In addition, the first locking member 33 and the second locking member 43 construct a two-stage locking mechanism, to lock the stroller steadily, thereby preventing the stroller from being folded accidentally, and thereby protecting the baby's safety.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A foldable stroller comprising:
   a main frame, a support unit, two fixed side units, two movable side units, and a guardrail;
   wherein:
   the main frame includes two joints, two upper connectors pivotally connected with the two joints respectively, a handlebar having two ends secured on the two upper connectors respectively, two lower connectors pivotally connected with the two joints respectively, a lower bar having two ends secured on the two lower connectors, and two front wheels mounted on a lower portion of the lower bar;
   the support unit includes two connecting members pivotally connected with the two lower connectors respectively, a movable support bar having two ends secured on the two connecting members respectively, and a fixed support rod having two ends mounted on the two connecting members respectively;
   each of the two fixed side units includes a leg having an upper end secured to one of the two joints and having a side provided with an opening, a first locking member movably mounted in the leg, a first spring biased between the first locking member and the leg to push the first locking member to protrude from the opening of the leg, a fixed block secured on the leg and having an interior provided with a receiving chamber and a face provided with a first locking hole connected to the receiving chamber, a release member movably mounted in the receiving chamber of the fixed block and provided with a cavity aligning with the first locking hole of the fixed block, a ramp formed on a bottom of the cavity of the release member, a pull handle secured on the release member and protruding from the fixed block, a second spring biased between the release member and the fixed block to push the release member and to align the cavity of the release member with the first locking hole of the fixed block, a wheel support mounted on a lower end of the leg, and a rear wheel pivotally mounted on the wheel support;
   each of the two movable side units includes a movable block slidably mounted on the leg and having a side provided with a second locking hole aligning with the opening of the leg and allowing insertion of the first locking member, a press knob mounted on the movable block and having a side provided with a projection aligning with the second locking hole of the movable block and resting on the first locking member, an extension extending upward from the movable block and having a side provided with a receiving recess aligning with the first locking hole of the fixed block, a second locking member movably mounted in the receiving recess of the extension, a third spring biased between the second locking member and the movable block to push the second locking member through the receiving recess of the extension into the first locking hole of the fixed block, and two braces each having a lower end pivotally connected with the movable block;
   one of the two braces of each of the two movable side units has an upper end pivotally connected with one of the two upper connectors of the main frame, and the other one of the two braces of each of the two movable side units has an upper end pivotally connected with one of the two lower connectors of the main frame; and
   the guardrail has two opposite ends removably mounted on the two joints of the main frame respectively.

2. The foldable stroller of claim 1, wherein:
   each of the two fixed side units further includes an inner piece secured in the leg and provided with a receiving space aligning with the opening of the leg;
   the first locking member is mounted in the receiving space of the inner piece;
   the first spring is biased between the first locking member and the inner piece;
   when the movable block slides on the leg to align the second locking hole with the opening of the leg, the first locking member is pushed by the first spring and is locked into the second locking hole and presses the projection of the press knob;

when the movable block slides on the leg to align the second locking hole with the opening of the leg, the receiving recess of the extension aligns with the first locking hole of the fixed block, and the second locking member is pushed by the third spring and extends through the first locking hole of the fixed block into the cavity of the release member; and the second locking member rests on the ramp of the release member.

3. The foldable stroller of claim 1, wherein:

the receiving chamber of the fixed block of each of the two fixed side units has a side provided with a slideway connected to the first locking hole;

the release member is provided with a protrusion movable in the slideway of the fixed block;

the protrusion of the release member is located under the cavity and has a top provided with an oblique face connected to the ramp of the release member;

the fixed block is located above the opening of the leg and has a side provided with an elongate slot connected to the receiving chamber; and the pull handle is disposed in and protrudes from the elongate slot of the fixed block.

4. The foldable stroller of claim 1, further comprising:

a connecting rod mounted between the two fixed side units and having two opposite ends each secured with the fixed block of one of the two fixed side units.

5. The foldable stroller of claim 1, further comprising:

a connecting pole mounted between the two fixed side units and having two opposite ends each secured with the wheel support of one of the two fixed side units.

* * * * *